United States Patent [19]
Quanbeck

[11] 3,782,481
[45] Jan. 1, 1974

[54] FIELD CULTIVATOR TOOL SUPPORT

[76] Inventor: Sherman H. Quanbeck, 705 S. 6th St., Breckenridge, Minn. 56520

[22] Filed: Dec. 29, 1971

[21] Appl. No.: 213,670

[52] U.S. Cl............ 172/265, 172/705, 172/710
[51] Int. Cl............................................. A01b 65/00
[58] Field of Search ..................172/264–265, 172/705–708, 710; 306/115

[56] References Cited
UNITED STATES PATENTS

| | | | |
|---|---|---|---|
| 3,536,146 | 10/1970 | Groenke | 172/710 |
| 3,606,928 | 9/1971 | Quanbeck | 172/265 |
| 3,097,705 | 7/1963 | Bopf | 172/710 |
| 3,258,076 | 6/1966 | Groenke | 172/710 |
| 3,493,055 | 2/1970 | Peursem | 172/710 |
| 3,223,175 | 12/1965 | Twidale | 172/264 |
| 3,529,673 | 9/1970 | Morris | 172/710 |

FOREIGN PATENTS OR APPLICATIONS

| | | | |
|---|---|---|---|
| 1,069,374 | 7/1954 | France | 172/705 |
| 583,730 | 9/1959 | Canada | 172/705 |
| 45,592 | 4/1932 | Denmark | 172/705 |
| 553,929 | 6/1926 | France | 172/705 |
| 330,876 | 12/1920 | Germany | 172/708 |

Primary Examiner—Robert E. Pulfrey
Assistant Examiner—Eugene H. Eickholt
Attorney—Ralph L. Dugger et al.

[57] ABSTRACT

An earth working tool support for use with large field cultivators comprising a mounting member adapted to be mounted onto the provided frame of a field cultivator. A shank holder is pivotally mounted to a support bracket and resilient means are provided for holding the shank holder and tool into working position. The shank holder is positioned for maximum clearance in its operating position. The support bracket is held securely on the frame of the field cultivator with only one U bolt, and the bracket includes integral stop means to retain the shank support in a normal operating position.

5 Claims, 4 Drawing Figures

PATENTED JAN 1 1974 3,782,481
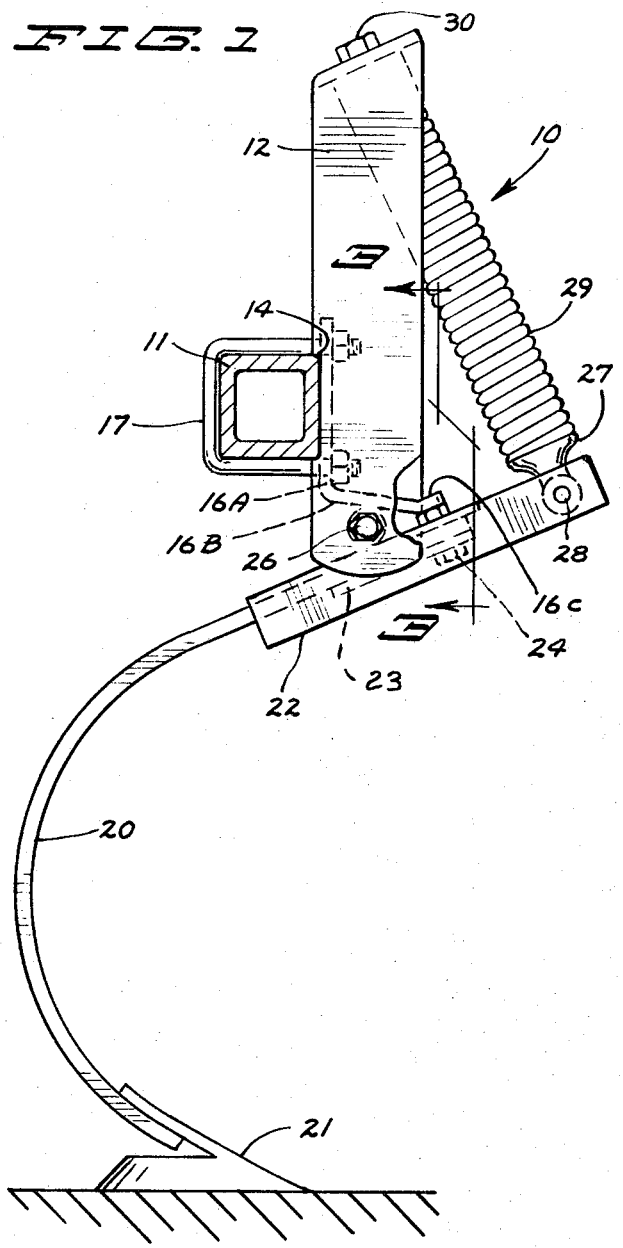
FIG. 1
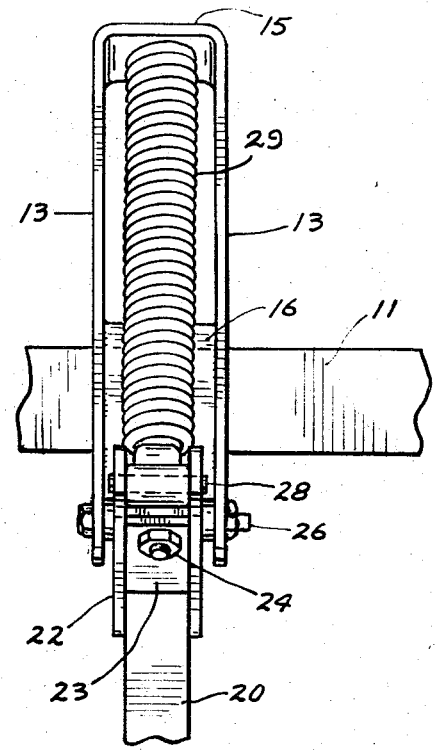
FIG. 2
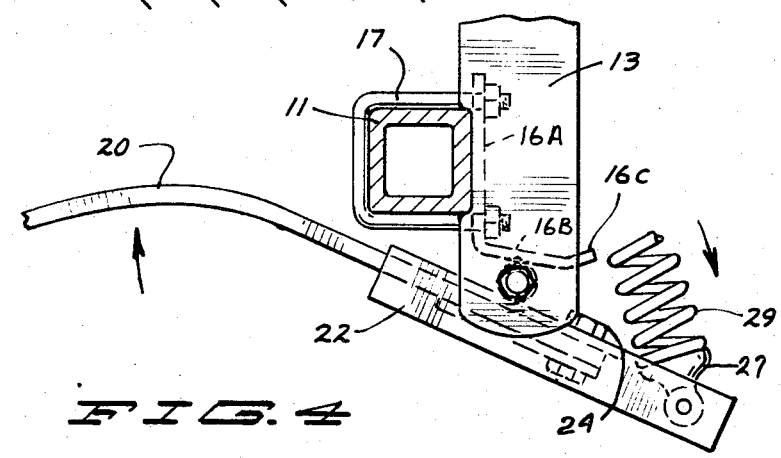
FIG. 3
FIG. 4

FIELD CULTIVATOR TOOL SUPPORT

BACKGROUND OF THE INVENTION

1. Field of the Invention

The present invention relates to tool supports for earth working tools.

2. Prior Art

In the prior art there are a large number of tool supports for tillage tools which incorporate various clamping assemblies, and pivoting mounting members so that the earth working tool can pivot. Usually a spring is provided for resisting this pivoting.

Part of the problem involved in the prior art tool supports is that the devices are expensive, and usually the clamping members for clamping the tool supports onto the frame members of a field cultivator do not solidly mount the tool on the frame member. Other problems involved include the mounting of the devices so that the clearance underneath the field cultivator frame, and also underneath the earth working tool is reduced by springs, for example, and further, the pivot of the tool support generally is positioned so that there is a great deal of wear on the pivot when the unit moves during operation.

SUMMARY OF THE INVENTION

The present invention relates to a very simple to construct, sturdy, easily mounted support for a working tool of a field cultivator. The bracket comprising the support gives a stable mounting onto the usual square frame members of the field cultivators, and the construction includes the use of a structural support member for forming a stop. The stop can be made adjustable by shimming the bolt holding the resilient cultivator shank in place on a pivoting shank holder. The shank holder is positioned to provide maximum trash clearance during operation to prevent undesirable plugging of the unit. The support includes a large sleeve that forms the pivoting member to minimize pivot wear, and the unit is mounted so that it gets a high trip clearance for going over obstacles such as rocks or the like.

BRIEF DESCRIPTION OF THE DRAWINGS

FIG. 1 is a side elevational view of a field cultivator tool support made according to the present invention;

FIG. 2 is a front elevational view of the device of FIG. 1 with parts broken away;

FIG. 3 is a view taken as on line 3—3 in FIG. 1; and

FIG. 4 is a fragmentary side elevational view showing the mounting assembly when the unit is in a tripped or elevated position.

DESCRIPTION OF THE PREFERRED EMBODIMENT

FIG. 1 there is shown a field cultivator tool support illustrated generally at 10 that is mounted onto a conventional square of rectangular frame member 11 of a field cultivator of usual design. These frame members 11 extend generally transversely to the direction of movement, and a number of the tool supports 10 are mounted onto each of the frame members 11 so that adequate coverage for cultivating a field is maintained across the width of the unit.

At the present time, when extremely large agricultural tractors are available, the requirements for wide field cultivators that have tool supports that will withstand very high loads has increased. In addition, the tools have to be able to pivot individually over obstructions without damage, and trash clearance is necessary in order for the field cultivator to be useable because of the large area covered. The tool support 10 as shown includes a main mounting frame 12 that has a pair of upright frame members or legs 13,13 that are spaced apart. The legs are notched as at 14 on the rear edges thereof so that they fit over the front portions of the frame member 11 of the field cultivator. The frame portions 13,13 are held together with a cross member 15 at the upper end thereof, and the legs may be integrally formed with the upper member as shown, or the cross member may be welded in place. The legs 13,13 are also held together with a transverse plate 16 that includes an upright extending portion 16A, positioned flush with the upright edges of notch 14 to form part of the clamping device, a laterally extending portion 16B and a stop portion 16C all formed from the same piece of bar stock. The upright portion 16A is provided with openings therethrough into which a U bolt 17 of usual design extends. The U bolt is used for clamping the assembly 10 onto the frame member 11 with suitable nuts at the outer ends of the U bolt, which bear against the upright portion 16A of the cross member 16. The lateral member 16B holds the bottom ends of the legs 13,13 together, and is securely welded to the legs.

The field cultivator shank 20 is made of spring steel and as shown is curved in the normal manner and carries a cultivator shovel 21, which comprises the earth working tool, at its lower end. The upper end of the shank 20 is mounted into a shank support pivot member 22 that comprises a channel shaped unit having a base at the top and a pair of parallel legs. A cross piece 23 is welded between the legs of the channel 22 a sufficient distance from the base of the channel pivot member 22 so that the end portion of the shank 20 can pass between the member 23 and the base of the channel. The shank is held in place with a single bolt 24 passing through provided openings in the base of the channel pivot member and cross member 23 as well as through an opening in the end portion of the shank.

The pivot member 22 has a pivot sleeve 25 welded to the top of the base thereof and extending transversely across the pivot member. As can be seen in FIG. 3, the pivot sleeve 25 extends outwardly beyond the sides of the pivot member 22, and this pivot sleeve fits between the inner surfaces of the lower ends of legs 13,13 of the attaching frame. The pivot sleeve also fits very closely below the underside of portion 16B of frame member 16 so that the ends of legs 13,13 are very firmly supported and held together adjacent the pivot sleeve. A pin 26 passes through provided apertures in the legs 13,13 and through the pivot sleeve 22. The pin is held in place to form the pivot pin for the unit. The pivoting is made to take place between the pin 26 and the sleeve 25 so that the wear on the pivot is minimized.

The outer end of the pivot member 22 has the base cut away, as shown, and a spring end member 27 is pivotally mounted between the legs of the pivot member 22 with a pin 28. The spring end member 27 is attached to a tension spring 29, that extends upwardly. The upper end of spring 29 has a suitable spring end member mounted therein into which a bolt 30 is threadably attached. The bolt 30 passes through the end member 15 and provides for tension adjustment of the spring 29. The spring 29 pivots as required with respect to the member 15 about the bolt 30 that attaches it to this end member.

The spring 29 resiliently resists pivoting of the shank 20 and shovel 21 in rearwardly and upwardly direction about the axis of pivot pin 26. The end member 16C of the member 16 aligns with the head of bolt 24, and thereby forms a stop against which the bolt head will rest when the tool is in its working position as shown in FIG. 1. Thus the member 16 reinforces the legs 13,13 forms a bracket for mounting the U bolt 17, holds the legs 13,13 secure adjacent the pivot bushing, and also has a portion that forms a stop for positioning the shank properly.

It can be seen that the top portion of the pivot member 22 extends upwardly and forwardly at an acute angle with respect to a horizontal line, when it is in its working position to give high trash clearance adjacent the forward portions of the member 22. This prevents excessive plugging of the machine in trashy conditions. The trash will not hang up readily on the rest of the structure that is inclined downwardly and rearwardly, as long as the forward portions ahead of the pivot are inclined upwardly. This keeps the spring 29 out of the trash as well, and insures maximum utilization of the clearance available under the frame members 11 without sacrificing rigidity and good strength.

In FIG. 4, the unit is shown pivoting to a lifted condition with the shank 20 raised upwardly toward the frame member 11, and the spring 29 has been extended. The pivoting in this manner is to clear obstructions, and of course as long as the obstruction strikes the shank 20 to the rear of the pivot, the unit will pivot upwardly. This insures adequate clearance in most situations. The pivoting also takes place under heavy loads on shovel 21.

The main bracket 12 holds not only the pivot, but also the tension adjustment bolt, and has the notches 14 for giving the support stability on the frame members. The use of expansion or tension springs rather than compression springs is also important because the spring can be easily manufactured and adjusted, and gives a lively, vibrating tooth action during use, because of the pivoting of the shank under heavy loads. The spring has decreasing leverage as the unit pivots, which builds up spring pressure, or in other words the line of action of the spring 29 moves closer to the pivot axis as the unit lifts away from the ground, so that maximum leverage is available when the unit is in its working condition. The angle between the spring center line and the line between the axes of pins 26 and 28 which is the lever arm of spring action, is less than 90° in the working position. This angle always decreases as the shank pivots.

The spaced, notched legs 13, with the bracket 16 and single U bolt connection (or two bolts, one on top and one on the bottom) give a very stable support to prevent twisting of the support bracket.

What is claimed is:

1. A tool support for a field cultivator tool adapted to be mounted onto a field cultivator frame member that is generally rectilinear in cross section and has an upright planar forward surface, said tool support comprising a mounting frame, said mounting frame including a pair of spaced apart generally upright extending planar legs, means joining said legs at the upper ends thereof and forming a first cross support, a second cross support extending between said legs and comprising a unitary member having a generally uprightly extending portion adjacent the rear edges of said legs, and having a portion extending forwardly from said upright portion toward the forward edges of said legs and being joined to said legs to form a rigid support between said legs in fore and aft direction, means to mount said mounting frame relative to the forward surface of said field cultivator frame member comprising bolt means passing through the upright portion of said second cross support to clamp said mounting frame against the forward surface of said field cultivator frame member, a tool shank, a tool shank support member adapted to fit between said legs below said second cross support, means to attach said tool shank to said shank support member, pivot means mounted closely adjacent the lower surface of the forwarding extending portion of said second cross support for pivotally mounting said shank support member to said mounting frame, said shank support member extending forwardly from the pivot means a substantial distance, with a portion thereof extending forwardly of the mounting frame, the forwardly extending portion of said second cross support having a forward end section, means on the shank support member abutting against the undersurface of said forward end section to provide a stop for said tool shank in a first working position, a tension spring connected between said first cross support of said mounting frame and the forwardly extending portion of said tool shank support member, said tool shank support member in working position being inclined upwardly in forward direction, and the line of force from said spring acting between the first cross support and the tool shank support member forming an angle with respect to said plane of said tool shank support member when the tool shank support member is in its stopped position, so that the effective spring lever arm acting on said tool shank support member decreases with pivoted movement of the tool shank from its stopped position when the tool shank encounters an obstruction.

2. The combination as specified in claim 1 wherein said first cross support of mounting frame has a general plane inclined to be substantially 90° to the line of force from the spring with the tool shank in its stopped position.

3. The combination as specified in claim 1 wherein said second cross support comprises a flat bar member bent to form the upright and forwardly extending portion, respectively, and said forward end section being bent to be positioned, substantially parallel to the plane of said tool shank support member in stopped position.

4. The combination as specified in claim 3 wherein said tool shank is attached to said tool shank support with a bolt, said bolt having a head which engages and stops against said forward end section with the tool shank in working position.

5. A tool support for a field cultivator tool adapted to be mounted onto a field cultivator frame member that is generally rectilinear in cross section and has an upright planar forward surface, said tool support comprising a mounting frame, said mounting frame including a pair of spaced apart generally upright extending planar legs, a first cross support joining said legs adjacent the upper ends thereof, a second cross support extending between said legs comprising a member adjacent the rear edges of said legs, means to mount said mounting frame relative to the forward surface of said field cultivator frame member comprising bolt means passing through the second cross support to clamp said mounting frame against the forward surface of said field cultivator frame member with the planar upright legs forwardly of the frame member, a tool shank, a tool shank support member adapted to fit between said upright legs below said second cross support, means to attach said tool shank to said tool shank support member, pivot means mounted in position ahead of said frame member for pivotally mounting said tool shank support member to said mounting frame, said tool shank support member extending forwardly from the pivot means with a portion thereof extending forwardly of the mounting frame, stop means cooperating between the tool shank support member and the mounting frame ahead of the field cultivator frame member to provide a stop for said tool shank in a first working position, the forward end of said tool shank support member being bifurcated to provide two laterally spaced legs, a tension spring connected at a first end thereof to said first cross support of said mounting frame, means pivotally connected to the forward end of said tool shank support member between the legs thereof about an axis substantially parallel to the axis of said pivot means and also connected to the second end of said tension spring, said tension spring thereby being forward of said field cultivator frame member, said tool shank support member in working position being inclined upwardly in forward direction, and the line of force from said spring acting between the first cross support and the shank support member forming an angle with respect to said plane of said tool shank support member when the tool shank support member is in its stopped position, so that the effective spring lever arm acting on said tool shank support member decreases with pivotal movement of the tool shank from its stopped position when the tool shank encounters an obstruction.

* * * * *

PO-1050
(5/69)

UNITED STATES PATENT OFFICE
CERTIFICATE OF CORRECTION

Patent No. 3,782,481  Dated January 1, 1974

Inventor(s) Sherman H. Quanbeck

It is certified that error appears in the above-identified patent and that said Letters Patent are hereby corrected as shown below:

Correction in Claim 1; Column 4, line 27, after "member" insert --to urge said tool shank support member toward said working position--; line 28, after "in" insert --the--; line 32, delete "said" and insert --the--; same line, after "plane" insert --of inclination--; line 33, delete "stopped" and insert --working--; line 35, delete "pivoted" and insert --pivotal--; line 36, after "shank" insert --support member--; same line, delete "stopped" and insert --working--.

Correction in Claim 2; Column 4, line 39 after "of" insert --the--; line 4, after "shank" insert --support member--; same line, delete "stopped" and insert --working--.

Correction in Claim 3; Column 4, line 47, after "positioned" delete the comma; line 48, delete "stopped" and insert --working--.

Correction in Claim 4; Column 4, line 50, after "support" insert --member--; line 53, after "shank" insert --support member--; same line, before "working" insert --the--.

Correction in Claim 5; Column 4, in each of lines 60, 62 and 63, after "said" insert --upright--. Column 5, line 6, after "said" insert --field cultivator--. Column 6, line 6, after "member" insert --to urge the tool shank support member toward said working position--; line 7, after "in" insert --the--; line 11, delete "said" and insert --the--; same line, after "plane" insert --of inclination--; line 13, delete "stopped" and insert --working--; line 15, after "shank" insert --support member--; line 16, delete "stopped" and insert --working--.

Signed and sealed this 24th day of September 1974.

(SEAL)
Attest:

McCOY M. GIBSON JR.
Attesting Officer

C. MARSHALL DANN
Commissioner of Patents